June 25, 1957 J. P. HILL 2,797,299
METHOD OF FORMING SERRATIONS AT THE BACK OF THE
BLADE OF CUTTING ELEMENTS
Original Filed March 22, 1954

INVENTOR.
JOHN P. HILL
BY Whittemore,
Hulbert & Belknap
ATTORNEYS

United States Patent Office 2,797,299
Patented June 25, 1957

2,797,299

METHOD OF FORMING SERRATIONS AT THE BACK OF THE BLADE OF CUTTING ELEMENTS

John P. Hill, Detroit, Mich., assignor to Goddard & Goddard Company, Detroit, Mich., a corporation of Michigan Application July 5, 1955, Serial No. 519,912, which is a division of application Serial No. 417,907, March 22, 1954, now Patent No. 2,778,924, dated January 22, 1957. Divided and this application September 10, 1956, Serial No. 608,720

4 Claims. (Cl. 219—69)

The present invention relates to a method of forming serrations at the back of the blade of cutting elements.

The present application is a division of my prior co-pending application Serial No. 519,912, entitled "Cutting Elements," filed July 5, 1955, which in turn is a division of my prior copending application Serial No. 417,907, entitled "Cutting Elements and Apparatus and Method for Producing Same," filed March 22, 1954, now Patent No. 2,778,924, dated January 22, 1957.

It is an object of the present invention to provide a cutting blade in the form of a relatively thin body having serrations at one side thereof and having a plane surface at the opposite side disposed in substantially accurate parallelism to the plane defined by the serrations or at a small angle thereto.

It is a further object of the present invention to provide a method of forming serrated surfaces in a cutting element which comprises providing a generally cylindrical electrode having annular circumferential serrations extending therearound, rotating said electrode, providing relative traverse between said electrode and the work piece to cause the electrode to traverse a surface of the work piece from side to side thereof with the serrations on the electrode producing corresponding serrations in the surface of the work piece while maintaining a high frequency electrical discharge between the electrode and work piece.

It is a further object of the present invention to practice a method as defined in the preceding paragraph which includes the step of initially forming serrations on the electrode having alternating ribs and grooves, the ribs having sides tapered substantially to a point in cross-section and having an included angle which is more acute than the included angle to be formed at the bottoms of the grooves of the serrations in the work piece, whereby consumption of the material of the ribs of the electrode during relative movement of the electrode to full depth in the work piece modifies the cross-sectional shape of the ribs of the electrode to conform to the required cross-sectional shape of the grooves on the work piece. The exact shape of serrations can of course be varied as required.

It is a further object of the present invention to provide apparatus for machining a serrated surface on a work piece by electrical discharge which comprises means for supporting a generally cylindrical electrode having annular circumferentially extending serrations comprising alternating ribs and grooves, means for rotating the electrode, a work support, means for effecting relative traverse between the electrode and work support in a direction perpendicular to the axis of the electrode with the electrode and work piece positioned so as to cause the serrations of the electrode to form and enter within corresponding serrations in the surfaces of the work piece while maintaining a high frequency electrical discharge between the electrode and work piece.

Other objects and features of the invention will become apparent as the description proceeds, especially when taken in conjunction with the accompanying drawings, wherein.

Figure 4:
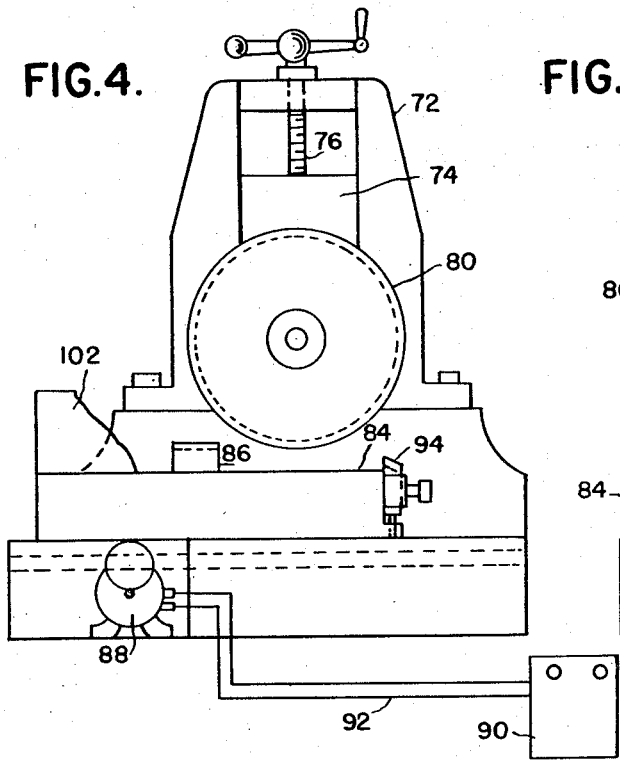
Figure 4 is a front elevational view of a machine producing serrated surfaces by electrical discharge machining.

The present invention relates to a novel cutting element or blade, and method or apparatus for making the same. Basically, the method and apparatus depends upon the use of equipment known as electric discharge machining equipment. In this type of machining means are provided for maintaining with great accuracy an extremely small gap between an electrode and a work piece while maintaining a high frequency electric discharge therebetween. This electric discharge may be at a rate of from 20,000 to millions of cycles per second. The gap between the electrode and the work piece is maintained at a dimension between .0002 inch to .0015 inch. The actual voltage differential between the electrode and work piece may be on the order of 50 volts. Preferably, the gap between the electrode and the work piece is submerged in a coolant.

Equipment for carrying out this operation, comprising means for establishing the required high frequency electrical potential to the electrode and for maintaining the required gap, including feeding means depending upon the rate of consumption of the work piece and electrode, is available. One source of such equipment is Elox, a corporation of Michigan having offices in Clawson, Michigan, who advertises this equipment as an electronic type machine tool.

The invention in the present case relates to method and apparatus for applying the basic machining operation in particular cases and makes no claim to the details of the apparatus for supplying the high frequency electrical voltage to the electrode or broadly, to control means responsive to a rate of consumption for effecting a required feeding operation. Certain aspects of the basic principles of electric discharge machining are disclosed in patents to Harding Nos. 2,383,382 and 2,441,319, granted August 21, 1945, and May 11, 1948, respectively.

Referring now to the drawings, there is illustrated a cutting blade 10 having cutting edges 12, 13 and 14, and relieved surfaces 16, 18 and 20 behind the cutting edges. The cutting edges 12, 13 and 14 are defined by the intersections of the relieved plane surfaces 16, 18 and 20 respectively, with a flat side 22 of the blade.

For mounting the blade in a holder it is preferably provided at its rear surface with serrations comprising alternated ribs 24 and grooves 26. The ribs and grooves 24 and 26 are parallel and of uniform cross-section. The sides of the ribs and grooves are inclined to intersect substantially at a point in cross-section and in a specific example of such a blade, the included angle at the apices of the ribs and the included angle between the sides of each groove are 90 degrees. The foregoing example is typical, but the exact cross-sectional shape of the serrations may be varied as desired.

In accordance with the present invention, blades of this type may be formed in their entirety of a hard cutting material such for example as cast alloy, tungsten carbide, or the like. Alternatively, the blades may be formed in their entirety of high speed steel. Certain aspects of the present invention are applicable to blades having body portions of metal and brazed inserts of cutting material such for example as tungsten carbide.

As is well understood, electric discharge machining is characterized by a consumption of the tool or electrode which may be equal to or which may exceed the removal of metal from the work piece. Accordingly, in developing methods and designing machines for the efficient use of electric discharge machining in the removal of metal, this relatively rapid consumption of the tool or electrode must be taken into account.

The electric discharge machining method affords the possibility of producing a serrated surface of various forms and pitch in conductive hard or soft material. In general terms, such a machine consists of a circular wheel of brass or other suitable conductive material of sufficient diameter and revolving at a suitable speed with the general form of the desired serrations machined into its outer surface. To compensate for any reduction in the wheel by consumption of the material thereof during the operation, the machine includes a forming tool designed to form the outer surface of the conducting wheel or electrode to the desired form. This tool is adjustably located so as to maintain the finished dimension of the work piece after redressing the conductive wheel or electrode for the purpose of making corrections for electrode or wheel reduction or consumption.

The forming tool is ground or machined to a form which provides compensation on the conducting wheel or electrode as necessary to allow for electrode consumption. In other words, the wheel or electrode has its periphery formed to a definite cross-sectional shape which will produce a different but predetermined and selected cross-sectional shape in the serrations as formed thereby on a work piece.

Figure 5:
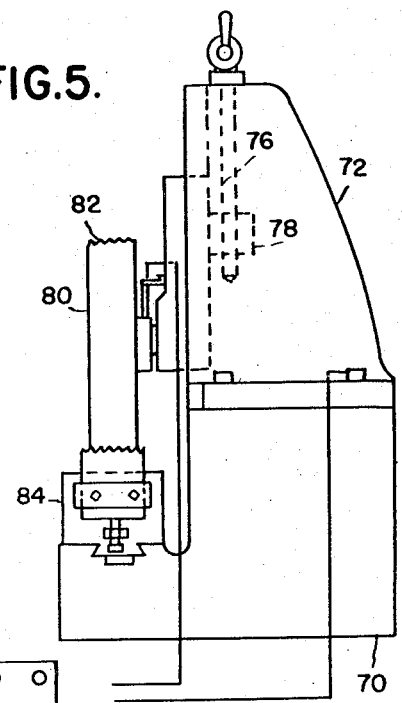
Figure 5 is a side elevational view of the machine shown in Figure 4.
Figure 6:
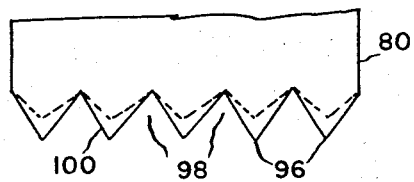
Figure 6 is an enlarged diagrammatic view illustrating the necessary modification of the serrations on an electrode of the machine shown in Figures 4 and 5 to produce the required shape of serrations in the work piece.
Figures 2, 3:
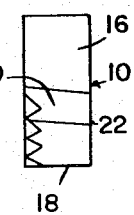
Figure 2 is a plan view of the blade shown in Figure 1.
Figure 3 is an end view of the blade shown in Figure 2.
Figure 1:
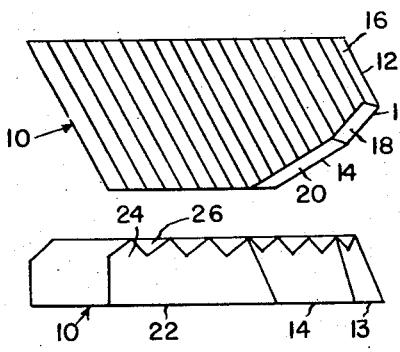
Figure 1 is a side view of a cutting blade embodying features of and constructed in accordance with the present invention.

Referring now to Figures 4–6 there is illustrated apparatus for forming serrations on the back of a work piece. This apparatus comprises a base 70 having a column 72 thereon at the front surface of which is a vertical adjustable slide 74. Manual means comprising a feed screw 76 and a feed nut 78 carried by the slide 74 are provided for effecting vertical adjustment of the slide 74. Mounted on the slide 74 is a rotatable tool or electrode 80, the outer surface of which is of generally cylindrical configuration and is serrated as indicated at 82. Means are provided for effecting rotation of the electrode 80 at moderate speed as for example a few revolutions per minute.

Mounted on the base 70 is a work carriage 84 adapted to support a work piece 86 thereon. Preferably, the work piece 86 is retained in position by suitable magnetic holding means provided on the top of the carriage 84. A motor 88 is provided for effecting traverse of the carriage 84 and this motor is under control of a control box 90 connected to the motor 88 by electrical conductors 92. Included in the electric discharge machining equipment are means responsive to an electrical condition representing the average spacing between the surface of the electrode and the adjacent surface of the work piece so that the carriage 84 is traversed at a rate dependent upon the rate of consumption or removal of material from the work piece.

Associated with the carriage 84 is a trimmer 94 which is adapted to trim the periphery of the electrode to the required contour.

Referring now to Figure 6, a portion of an electrode 80 is illustrated on an enlarged scale. The serrations thereof comprise alternated ribs 96 and grooves 98 having side walls 100. In the machining operation the periphery of the electrode 80 is trimmed to have the configuration illustrated in full lines in Figure 6. With the parts in the position illustrated in Figure 4, the machining operation is initiated by traversing the carriage 84 to the right. At this time the slide 74 will be adjusted to a predetermined position which will result in machining serrations in the upper surface of the work piece 86 to a required depth. Traverse of the carriage is under control of the control box 90. During the interval between initiation of removal of metal from the work piece and the time when the leading edge of the work piece is advanced to a point directly beneath the center of the electrode, material will be consumed from the serrations on the electrode and it is found that this consumption of material may be compensated for exactly by initially forming the ribs 96 with an included angle at their apices somewhat more acute than the required angle at the bottoms of the corresponding grooves to be formed in the work piece. Thus, during relative movement between the electrode and work piece to a full depth position, the shape of the ribs 96 on the electrode are changed from the shape illustrated in full lines in Figure 6 to the required shape illustrated in dotted lines in this figure. During the balance of the machining operation the shape of the ribs 96 is not modified, although consumption of material from the surfaces thereof continues at a uniform rate.

Dependent upon the length of serrations to be machined in the surface of the work piece and the circumference of the electrode, vertical adjustment of the slide 74 during the machining and a single work piece may or may not be necessary. In any case, when the machining operation is completed, the peripheral surface of the electrode will be again trimmed to the contour illustrated in full lines in Figure 6 prior to the initiation of machining a second work piece.

Preferably, the machining operation is carried out with the working surface of the electrode submerged in a suitable coolant and for this purpose the work support of the machine illustrated in Figure 4 may include a wall 102 forming with the work support a coolant containing tank.

In the past, efforts to produce cutting blades having serrated backs and adapted to be clamped in a correspondingly serrated holder having encountered difficulties in that it was difficult to obtain substantially accurate parallelism between the serrated back surface and the blade and the plane or flat front surface thereof opposite to the serrated surface. Attempts have been made to produce blades formed in their entirety of a single piece of hard cutting material such as, for example, tungsten carbide by a grinding operation. It has been necessary to clamp the blade strongly against movement during a grinding operation with the result that when the clamping stress was removed the blade assumed a different configuration. Inasmuch as the present method of machining does not involve any actual contact between the blade and tool, it is unnecessary to set up stresses in clamping or holding the blade for the machining operation. Accordingly, a blade may be produced having substantially accurate parallel surfaces, one of which is serrated and the other of which is flat. This operation may be carried out by supporting the blade on a magnetic table and forming either the serrations or the flat surface thereof by electric discharge machining. Since this operation is carried out without stressing the blade, the machined surface will have an accuracy dependent upon the accuracy of the tool, which accuracy may of course be within negligible limits. Thereafter, the blade is inverted to rest upon the flat supporting surface of the work support with its previously machined surface in contact therewith and the other surface thereof machined by arc machining. By this method, even if the blade is initially distorted or out of a true shape, it will be obvious that the two sequential machining operations will result in a blade characterized by substantially exact flatness and parallelism or controlled angularity between the two opposite surfaces thereof. This is of particular importance since the hard cutting materials of the tungsten carbide type are brittle and have a tendency to break if the clamping in the holder results in bending of the blade.

While the present invention has been disclosed in connection with tungsten carbide material, certain advantages thereof are valuable in any cutting material. By way of example it may be mentioned that the present invention permits the economical production of cutting blades formed in whole or in part of high speed steel in an operation which permits hardening of the blade followed by the formation of serrations therein.

It will of course be appreciated that the present invention may be combined with other operations. Thus for example, a tungsten carbide blade may initially be cast with rough serrations therein and the operations disclosed herein carried out as a final finishing operation.

The drawings and the foregoing specification constitute a description of the improved method of forming serrations at the back of the blade of cutting elements in such full, clear, concise and exact terms as to enable any person skilled in the art to practice the invention, the scope of which is indicated by the appended claims.

What I claim as my invention is:

1. The method of forming parallel serrations in one surface of a cutting blade which comprises providing a rotary electrode having circumferential serrations, rotating said electrode about its axis, relatively traversing said electrode and a blade in a direction perpendicular to the axis of said electrode while maintaining constant spacing of the axis of the electrode and the surface being serrated to form serrations in the blade of uniform depth progressively across the surface of the blade, and establishing a high frequency electric discharge between the electrode and blade.

2. The method as defined in claim 1, which comprises initially forming serrations defining ribs on the electrode with a more acute angle at their apex than at the bottom of the grooves in the blade, partly consuming the material of the ribs on the electrode as the electrode is relatively fed to full depth, and thereby altering the shape of the ribs to conform to the desired shape of grooves on the blades.

3. An electrode for electric discharge machining of parallel alternate tapered ribs and grooves of uniform cross-section comprising a cylindrical body of electric conducting material having axially alternated circumferentially extending tapered ribs and grooves, said ribs having initially an included angle at their apex smaller than the angle at the bottom of the grooves formed thereby in a work piece by an amount such as said electrode is fed laterally to full depth in a work piece, consumption of said electrode will change the cross-sectional shape of said ribs to conform to the desired cross-sectional shape of grooves in the work piece.

4. The method of making a thin flat cutting blade having a flat smooth surface at one side and a regularly serrated surface at the opposite side which is in parallelism with the smooth flat side which comprises supporting the blade with its previously finished flat smooth surface supported on a flat smooth support surface, providing a rotary electrode having circumferential serrations above said support surface with its axis parallel thereto, rotating said electrode about its axis, relatively traversing said electrode and a blade in a direction perpendicular to the axis of said electrode while maintaining constant spacing of the axis of the electrode and the surface being serrated to form serrations in the blade of uniform depth progressively across the surface of the blade, and establishing a high frequency electric discharge between the electrode and blade.

References Cited in the file of this patent

UNITED STATES PATENTS 2,355,838    Young _____ Aug. 15, 1944